United States Patent
Oguro et al.

(10) Patent No.: US 10,651,447 B2
(45) Date of Patent: May 12, 2020

(54) HEAT-SENSITIVE LAYER FOR LITHIUM ION SECONDARY BATTERY

(71) Applicant: ZEON CORPORATION, Chiyoda-ku Tokyo (JP)

(72) Inventors: Hiroki Oguro, Tokyo (JP); Kouichirou Maeda, Tokyo (JP); Naoki Takahashi, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 71 days.

(21) Appl. No.: 16/063,800

(22) PCT Filed: Dec. 13, 2016

(86) PCT No.: PCT/JP2016/087117
§ 371 (c)(1),
(2) Date: Jun. 19, 2018

(87) PCT Pub. No.: WO2017/115647
PCT Pub. Date: Jul. 6, 2017

(65) Prior Publication Data
US 2019/0165350 A1    May 30, 2019

(30) Foreign Application Priority Data

Dec. 28, 2015 (JP) .................................. 2015-256592

(51) Int. Cl.
*B32B 7/02* (2019.01)
*H01M 2/16* (2006.01)
*H01M 10/0525* (2010.01)

(52) U.S. Cl.
CPC ............. *H01M 2/1673* (2013.01); *B32B 7/02* (2013.01); *H01M 2/1653* (2013.01); *H01M 2/1686* (2013.01); *H01M 10/0525* (2013.01)

(58) Field of Classification Search
CPC ...... H01M 2/1673; H01M 2/1653; B32B 7/02
See application file for complete search history.

(56) References Cited

U.S. PATENT DOCUMENTS

| 9,005,807 B2 | 4/2015 | Honda |
| 2003/0113626 A1 | 6/2003 | Maeda et al. |
| 2006/0194135 A1* | 8/2006 | Hayashi ............ G03G 9/08711 430/108.4 |
| 2012/0208082 A1* | 8/2012 | Honda .................... H01M 4/60 429/210 |

FOREIGN PATENT DOCUMENTS

| JP | 2009026674 A | 2/2009 |
| JP | 4929540 B2 | 5/2012 |
| JP | 5177301 B2 | 4/2013 |
| WO | 2014149181 A1 | 9/2014 |

OTHER PUBLICATIONS

May 21, 2019, the Extended European Search Report issued by the European Patent Office in the corresponding European Patent Application No. 16881626.2.

Encyclopedia of Experimental Chemistry 28, Fourth Edition, Polymer Synthesis, Edited by The Chemical Society of Japan, May 6, 1992, p. 49, I. 20-p. 51, I. 7, vol. 28, Maruzen.

Jul. 3, 2018, International Preliminary Report on Patentability issued in the International Patent Application No. PCT/JP2016/087117.

* cited by examiner

*Primary Examiner* — Tae-Sik Kang
(74) *Attorney, Agent, or Firm* — Kenja IP Law PC

(57) ABSTRACT

Provided is a heat-sensitive layer for a lithium ion secondary battery that can efficiently block rising temperature during abnormal heating by increasing battery internal resistance and thereby reducing current. The heat-sensitive layer for a lithium ion secondary battery is formed from a heat-sensitive layer composition containing particles in each of which a second component is substantially partially disposed at the outside of a particle formed from a first component. The heat-sensitive layer composition has a storage modulus at 60° C. of 10 kPa or more and a storage modulus at 150° C. of 1 kPa or less.

7 Claims, No Drawings

HEAT-SENSITIVE LAYER FOR LITHIUM ION SECONDARY BATTERY

TECHNICAL FIELD

This disclosure relates to a heat-sensitive layer for a lithium ion secondary battery.

BACKGROUND

The demand for lithium ion secondary batteries having compact size, light weight, high energy density, and the ability to be repeatedly charged and discharged is expected to increase in the future also from an environmental perspective. Lithium ion secondary batteries are used in various fields such as mobile telephones and notebook computers due to their high energy density. However, expansion of applications for lithium ion secondary batteries and development thereof have been accompanied by demand for even higher performance in terms of low resistance, high capacity, and so forth.

A separator has an important function of preventing an electrical short-circuit between the positive and negative electrodes of a lithium ion secondary battery. The separator of a lithium ion secondary battery is typically a microporous membrane formed, for example, from a polyolefin resin. The separator normally also has a role of maintaining the safety of the lithium ion secondary battery by displaying a shutdown function of cutting off current in a situation in which the battery internal temperature reaches a high temperature of around 130° C., for example, by melting to block the micropores and thereby prevent migration of lithium ions. However, if the battery temperature further exceeds the melting point of the constituent resin of the separator due to momentary heat generation, the separator may rapidly contract, leading to an increase in locations at which the positive electrode and the negative electrode come into direct contact to cause a short-circuit. In such a situation, the battery temperature rises to hundreds of degrees Celsius or higher and the battery reaches an abnormally heated state.

In view of the above, it has been proposed that thermally expansive microcapsules may be used to inhibit a rise in temperature during abnormal heating. PTL 1 discloses a current collector including a resin layer and an adhesive layer that is conductive. Thermally expansive microcapsules in which an expansive material is encapsulated in a shell containing a thermoplastic polymer material are used in the adhesive layer. In another example described in PTL 2, thermally expansive microcapsules in which a low boiling point hydrocarbon is encapsulated in a copolymer shell are dispersed in an electrode active material layer. In yet another example described in PTL 3, thermally expansive microcapsules obtained through in situ polymerization of a low boiling point hydrocarbon or a foaming agent in a thermoplastic resin of vinylidene chloride, acrylonitrile, or the like are added into an electrolysis solution.

CITATION LIST

Patent Literature

PTL 1: JP 5177301 B
PTL 2: JP 4929540 B
PTL 3: JP 2009-26674 A

SUMMARY

Technical Problem

However, in the case of the thermally expansive microcapsules described in PTL 1 to 3, it is necessary to cover the inner material with the outer (shell) material, which necessitates a sufficient amount of the outer material for completely covering the inner material. Moreover, efficiency is poor because, for example, it is necessary to produce a special current collector in order to inhibit a rise in temperature during abnormal heating in PTL 1, whereas the use of another binder in addition to the thermally expansive capsules is required for electrode active material layer formation in PTL 2.

Accordingly, an objective of this disclosure is to provide a heat-sensitive layer for a lithium ion secondary battery that can efficiently block rising temperature during abnormal heating by increasing battery internal resistance and thereby reducing current.

Solution to Problem

Through diligent studies, the inventors discovered that the objective set forth above can be achieved through use of a heat-sensitive layer composition containing specific particles, and thereby completed this disclosure.

Specifically, this disclosure provides the following.

(1) A heat-sensitive layer for a lithium ion secondary battery formed from a heat-sensitive layer composition comprising particles in each of which a second component is substantially partially disposed at the outside of a particle formed from a first component, wherein the heat-sensitive layer composition has a storage modulus at 60° C. of 10 kPa or more, and the heat-sensitive layer composition has a storage modulus at 150° C. of 1 kPa or less.

(2) The heat-sensitive layer for a lithium ion secondary battery according to (1), positioned between a positive electrode active material layer and a negative electrode active material layer that oppose one another.

(3) The heat-sensitive layer for a lithium ion secondary battery according to (1) or (2), wherein the first component has a melting point of at least 60° C. and not higher than 160° C.

(4) The heat-sensitive layer for a lithium ion secondary battery according to any one of (1) to (3), wherein the second component has a glass transition temperature of at least −60° C. and not higher than 20° C.

(5) The heat-sensitive layer for a lithium ion secondary battery according to any one of (1) to (4), wherein the first component includes a polyolefin having a number average molecular weight of at least 5,000 and not more than 15,000.

(6) A lithium ion secondary battery comprising the heat-sensitive layer for a lithium ion secondary battery according to any one of (1) to (5) between a positive electrode active material layer and a negative electrode active material layer that oppose one another.

Advantageous Effect

Through the presently disclosed heat-sensitive layer for a lithium ion secondary battery, it is possible to efficiently block rising temperature during abnormal heating by increasing battery internal resistance and thereby reducing current.

DETAILED DESCRIPTION

The following describes a presently disclosed heat-sensitive layer for a lithium ion secondary battery. The presently disclosed heat-sensitive layer for a lithium ion secondary battery (hereinafter, also referred to as a "heat-sensitive layer") is formed from a heat-sensitive layer composition containing particles in each of which a second component is substantially partially disposed at the outside of a particle formed from a first component. In addition, the heat-sensitive layer composition has a storage modulus at 60° C. of 10 kPa or more and a storage modulus at 150° C. of 1 kPa or less.

(Heat-Sensitive Layer Composition)

The heat-sensitive layer composition used herein contains particles in each of which a second component is substantially partially disposed at the outside of a particle formed from a first component (hereinafter, also referred to simply as "particles"). Although the heat-sensitive layer composition may contain components other than particles in which a second component is substantially partially disposed at the outside of particles formed from a first component, it is preferable that the heat-sensitive layer composition is composed of only these particles.

(Particles)

In each of the aforementioned particles, a second component is substantially partially disposed at the outside of a particle formed from a first component. Herein, "substantially partially disposed" means that the particle formed from the first component is not completely covered by the second component and that the first component and the second component are both in an exposed state at the particle surface. Specific examples of structures such as described above include a snowman structure that, with respect to a spherical particle having a core-shell structure including a central portion (particle formed from first component) and an outer shell (second component) that are formed from different polymers, is a structure in which some of the central portion (particle formed from first component) is exposed at the outer shell (second component); and an octopus ocellatus structure in which particles of a different type (second component) are embedded in the surface of a spherical particle (particle formed from first component) to yield an integrated structure. Moreover, the particles may be particles in which two or more heterophase structures such as described above are further combined to form a single composite particle.

Note that in the particle formed from the first component, the first component composes at least a surface portion of the particle. In other words, the particle formed from the first component may be composed of only the first component, or may include another component that is different from the first component inside of a surface portion composed of the first component.

(Particle Formed from First Component)

The first component included in the particle formed from the first component is preferably a component that melts during abnormal heating in a lithium ion secondary battery and has viscosity within a specific range once melted, and is particularly preferably a polymer such as a polyolefin.

The term "polyolefin" refers to a polymer including a repeating unit (monomer unit) derived from an unsaturated hydrocarbon having at least one carbon double bond in molecules thereof. Examples of polyolefins that may be used include high-density polyethylene, low-density polyethylene, polypropylene (PP), polybutene, polybutadiene, butadiene-isoprene copolymer, polyisoprene, ethylene-vinyl acetate copolymer (EVA), ethylene-ethyl acrylate copolymer, ethylene-propylene copolymer (EPR), ethylene-propylene-diene terpolymer, and hydrogenated styrene-butadiene block copolymer. These polyolefins may be used individually or as a combination of two or more types. Also note that a polyolefin derivative such as a chlorinated polyolefin may be used as the polyolefin. Moreover, the polyolefin may be used in the form of a polyolefin wax. The proportion constituted by the repeating unit (monomer unit) derived from an unsaturated hydrocarbon having at least one carbon double bond in molecules thereof that is included in the polyolefin is preferably 70 mass % or more.

The molecular weight of the polyolefin is preferably 5,000 or more, more preferably 6,000 or more, and even more preferably 7,000 or more, and is preferably 15,000 or less, more preferably 12,000 or less, and even more preferably 10,000 or less from a viewpoint that the balance in terms of melting point and viscosity upon melting is excellent and a sufficient increase in lithium ion secondary battery internal resistance upon melting is obtained. When the molecular weight of the polyolefin is not more than the upper limit of any of the ranges set forth above, it is possible to inhibit a phenomenon in which the molten polyolefin does not readily spread out due to having a high viscosity upon melting, and consequently internal resistance cannot be sufficiently increased. Moreover, when the molecular weight of the polyolefin is at least the lower limit of any of the ranges set forth above, it is possible to inhibit the occurrence of a phenomenon in which the melting point of the polyolefin becomes too low. Therefore, it is possible to inhibit a phenomenon in which the polyolefin melts even in a normal state without abnormal heating, leading to an increase in internal resistance and a significant drop in battery performance.

The melting point of the first component is preferably 60° C. or higher, and more preferably 80° C. or higher, and is preferably 160° C. or lower, and more preferably 140° C. or lower from a viewpoint of blocking rising temperature during abnormal heating by melting so as to increase battery internal resistance and thereby reduce current. When the melting point of the first component is within any of the ranges set forth above, it is possible to inhibit a phenomenon in which, as a result of the melting point of the first component being too high, a separator undergoes thermal shrinkage to cause short-circuiting, and a rapid increase in temperature occurs before the first component melts. Moreover, it is possible to inhibit a phenomenon in which, as a result of the melting point of the first component being too low, the first component melts even in a normal state without abnormal heating, leading to an increase in internal resistance and a significant drop in battery performance.

The particle formed from the first component may further contain various known additives (antioxidants) that can be added to polymers such as polyolefins.

(Second Component)

The second component that is substantially partially disposed at the outside of the particle formed from the first component may be any component that imparts binding capacity on the particle without any specific limitations and is preferably a polymer such as an acrylic polymer.

The second component normally has a different chemical composition to the first component.

An acrylic polymer is a polymer that includes a monomer unit obtained through polymerization of a (meth)acrylic acid ester compound. Examples of acrylic polymers that may be used include a homopolymer of a (meth)acrylic acid ester compound and a copolymer of a (meth)acrylic acid ester compound and a monomer that is copolymerizable with the (meth)acrylic acid ester compound. Through use of a polymer of a (meth)acrylic acid ester compound, the heat-sensitive layer obtained from the heat-sensitive layer composition containing the particles can be provided with better close adherence to an electrode active material layer (positive electrode active material layer or negative electrode active material layer) or a separator. Herein, "(meth)acryl" is used to indicate "acryl" or "methacryl".

Examples of (meth)acrylic acid ester compounds that may be used include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, and 2-ethylhexyl acrylate; acrylic acid alkoxyalkyl esters such as 2-methoxyethyl acrylate and 2-ethoxyethyl acrylate; 2-(perfluoroalkyl)ethyl acrylates such as 2-(perfluorobutyl)ethyl acrylate and 2-(perfluoropentyl)ethyl acrylate; methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, tridecyl methacrylate, n-tetradecyl methacrylate, stearyl methacrylate, and 2-ethylhexyl methacrylate; methacrylic acid alkoxyalkyl esters such as 2-methoxyethyl methacrylate and 2-ethoxyethyl methacrylate; 2-(perfluoroalkyl)ethyl methacrylates such as 2-(perfluorobutyl)ethyl methacrylate and 2-(perfluoropentyl)ethyl methacrylate; benzyl acrylate; and benzyl methacrylate. Of these (meth)acrylic acid ester compounds, it is particularly preferable that at least one of 2-ethylhexyl acrylate, n-butyl acrylate, and t-butyl acrylate is included in the (meth)acrylic acid ester compound used for producing the acrylic polymer. One (meth)acrylic acid ester compound may be used individually, or two or more (meth)acrylic acid ester compounds may be used in combination in a freely selected ratio.

The proportion constituted by a monomer unit obtained through polymerization of the (meth)acrylic acid ester compound (hereinafter, also referred to as a "(meth)acrylic acid ester monomer unit") that is included in the second component is preferably 40 mass % or more, more preferably 50 mass % or more, and particularly preferably 60 mass % or more, and is preferably 95 mass % or less, more preferably 90 mass % or less, and particularly preferably 85 mass % or less. By setting the proportion constituted by the (meth)acrylic acid ester monomer unit as at least the lower limit of any of the ranges set forth above, binding capacity between the obtained heat-sensitive layer and an electrode active material layer (positive electrode active material layer or negative electrode active material layer) or a separator can be further improved. Moreover, a heat-sensitive layer composition having excellent stability can be obtained by setting the proportion constituted by the (meth)acrylic acid ester monomer unit as not more than any of the upper limits set forth above.

Examples of monomers that are copolymerizable with a (meth)acrylic acid ester compound include unsaturated carboxylic acids such as acrylic acid, methacrylic acid, itaconic acid, and fumaric acid; carboxylic acid esters having at least two carbon-carbon double bonds such as ethylene glycol dimethacrylate, diethylene glycol dimethacrylate, and trimethylolpropane triacrylate; styrenic monomers such as styrene, chlorostyrene, vinyltoluene, t-butylstyrene, vinylbenzoic acid, methyl vinylbenzoate, vinylnaphthalene, chloromethyl styrene, hydroxymethyl styrene, α-methyl styrene, and divinylbenzene; amide monomers such as acrylamide, N-methylolacrylamide, and acrylamido-2-methylpropane sulfonic acid; α,β-unsaturated nitrile compounds such as acrylonitrile and methacrylonitrile; olefins having one carbon double bond such as ethylene and propylene; diene monomers such as butadiene and isoprene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; heterocycle-containing vinyl compounds such as N-vinylpyrrolidone, vinylpyridine and vinylimidazole; and glycidyl group-containing monomers such as glycidyl acrylate, glycidyl methacrylate, and allyl glycidyl ether. Moreover, a plurality of such monomers may be used together as copolymerizable monomers.

The second component may contain a reactive surfactant unit. The reactive surfactant unit is a structural unit having a structure formed through polymerization of a reactive surfactant. The reactive surfactant unit constitutes part of the second component and functions as a surfactant.

The reactive surfactant is a monomer having a polymerizable group that can be copolymerized with another monomer and having surfactant groups (i.e., a hydrophilic group and a hydrophobic group). The reactive surfactant normally has a polymerizable unsaturated group that acts as a hydrophobic group after polymerization. Examples of the polymerizable unsaturated group of the reactive surfactant include a vinyl group, an allyl group, a vinylidene group, a propenyl group, an isopropenyl group, and an isobutylidene group. One type of polymerizable unsaturated group may be used individually, or two or more types of polymerizable unsaturated groups may be used in combination in a freely selected ratio.

The reactive surfactant normally has a hydrophilic group as a portion that expresses hydrophilicity. Reactive surfactants are classified as anionic, cationic, and non-ionic surfactants depending on the type of hydrophilic group.

Examples of anionic hydrophilic groups include —$SO_3M$, —COOM, and —$PO(OH)_2$, where M represents a hydrogen atom or a cation. Examples of the cation include ions of alkali metals such as lithium, sodium, and potassium; ions of alkaline earth metals such as calcium and magnesium; an ammonium ion; ammonium ions of alkylamines such as monomethylamine, dimethylamine, monoethylamine, and triethylamine; and ammonium ions of alkanolamines such as monoethanolamine, diethanolamine, and triethanolamine.

Examples of cationic hydrophilic groups include primary amine salts such as —$NH_2HX$, secondary amine salts such as —$NHCH_3HX$, tertiary amine salts such as —$N(CH_3)_2HX$, and quaternary amine salts such as —$N^+(CH_3)_3X^-$, where X represents a halogen group.

Examples of non-ionic hydrophilic groups include —OH.

Examples of suitable reactive surfactants include compounds represented by the following formula (I).

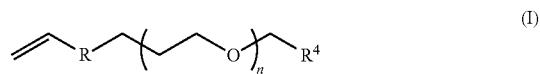

(I)

In formula (I), R is a divalent linking group. Examples of R include an —Si—O— group, a methylene group, and a phenylene group.

$R^4$ in formula (I) represents a hydrophilic group. Examples of $R^4$ include —$SO_3NH_4$.

Moreover, n in formula (I) represents an integer of at least 1 and not more than 100.

Another example of a suitable reactive surfactant is a compound that includes a structural unit having a structure formed through polymerization of ethylene oxide and a structural unit having a structure formed through polymerization of butylene oxide, and that has an alkenyl group including a terminal double bond and —$SO_3NH_4$ at the terminals thereof (for example, ammonium polyoxyalkylene alkenyl ether sulfate (product name: "LATEMUL PD-104" and "LATEMUL PD-105"; produced by Kao Corporation)).

One type of reactive surfactant and reactive surfactant unit may be used individually, or two or more types of reactive surfactants and reactive surfactant units may be used in combination in a freely selected ratio.

The proportion constituted by the reactive surfactant unit included in the second component is preferably 0.1 mass % or more, more preferably 0.2 mass % or more, and particularly preferably 0.5 mass % or more, and is preferably 5 mass % or less, more preferably 4 mass % or less, and particularly preferably 2 mass % or less.

The glass transition temperature of the second component is preferably −60° C. or higher, more preferably −55° C. or higher, and even more preferably −50° C. or higher, and is preferably 20° C. or lower, more preferably 15° C. or lower, even more preferably 10° C. or lower, and most preferably −30° C. or lower from a viewpoint of obtaining a heat-sensitive layer composition that can form a heat-sensitive layer having adequate close adherence to an electrode active material layer (positive electrode active material layer or negative electrode active material layer) or a separator. Through a second component glass transition temperature that is within any of the ranges set forth above, it is possible to inhibit a phenomenon in which binding capacity of the obtained heat-sensitive layer is inadequate.

It is preferable that the second component maintains binding capacity as a binder even when the first component is in a molten state.

(Production of Particles)

The particles can be obtained, for example, through (co)polymerization of monomer(s) leading to the second component in the presence of particles formed from the first component. Although no specific limitations are placed on the method of copolymerization of monomers leading to the second component in the presence of particles formed from the first component, it is preferable to adopt a method in which monomers leading to the second component are emulsion polymerized in an aqueous dispersion of particles formed from the first component. Through this method, it is possible to obtain particles in which the second component is substantially partially disposed at the outside of the particles formed from the first component. Note that "(co) polymerization" is used to indicate "polymerization" or "copolymerization". The particles formed from the first component can be produced, for example, by mixing the first component, a dispersion medium, and a surfactant at a temperature that is at least as high as the melting point of the first component, and subsequently performing cooling in a dispersed state in a disperser; however, the particles formed from the first component are not specifically limited to being produced in this manner.

The polymerization process may be a batch process, a semi-continuous process, or a continuous process. No particular limitations are placed on the polymerization pressure, polymerization temperature, and polymerization time, and commonly known conditions may be adopted.

The emulsion polymerization is normally carried out by a standard method. For example, the emulsion polymerization may be carried out by a method described in Vol. 28 of "Encyclopedia of Experimental Chemistry" (published by Maruzen; edited by The Chemical Society of Japan). Specifically, this is a method in which water, additives such as a dispersant, an emulsifier, and a crosslinking agent, a polymerization initiator, and a monomer solution are added into a sealed vessel equipped with a stirrer and a heating device to obtain a specific composition, the monomer composition in the vessel is stirred to emulsify monomers and the like in the water, and the temperature is increased under stirring to initiate polymerization, or a method in which the monomer composition is added into the sealed vessel after emulsification and then a reaction is initiated in the same manner. In the emulsion polymerization, various additives such as surfactants, polymerization initiators, chain transfer agents, chelating agents, electrolytes, and oxygen scavengers that are typically used in emulsion polymerization reactions may be used as auxiliary materials for polymerization.

The surfactant used in emulsion polymerization may be any surfactant with which the desired particles can be obtained. Examples of surfactants that may be used include sodium dodecylbenzenesulfonate, sodium lauryl sulfate, sodium dodecyl diphenyl ether disulfonate, and sodium dialkyl sulfosuccinate. One surfactant may be used individually, or two or more surfactants may be used in combination in a freely selected ratio.

Although the amount of the surfactant may be any amount with which the desired particles can be obtained, the amount of the surfactant relative to 100 parts by mass, in total, of monomers leading to the second component is preferably 0.5 parts by mass or more, and more preferably 1 part by mass or more, and is preferably 10 parts by mass or less, and more preferably 5 parts by mass or less.

A polymerization initiator is normally used in the polymerization reaction. The polymerization initiator may be any polymerization initiator with which the desired particles can be obtained. Examples of polymerization initiators that may be used include sodium persulfate (NaPS), ammonium persulfate (APS), and potassium persulfate (KPS). Of these polymerization initiators, sodium persulfate and ammonium persulfate are preferable, and ammonium persulfate is more preferable. Deterioration of cycle characteristics of an obtained lithium ion secondary battery can be suppressed through use of ammonium persulfate or sodium persulfate as the polymerization initiator.

Moreover, a molecular weight modifier or chain transfer agent may be included in the polymerization system during polymerization. Examples of molecular weight modifiers and chain transfer agents that may be used include alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethyl xanthogen disulfide and diisopropyl xanthogen disulfide; terpinolene; thiuram compounds such as tetramethylthiuram disulfide, tetraethylthiuram disulfide, and tetramethylthiuram monosulfide; phenolic compounds such as 2,6-di-t-butyl-4-methylphenol and styrenated phenol; allyl compounds such as allyl alcohol; halogenated hydrocarbon compounds such as dichloromethane, dibromethane, and carbon tetrabromide; thioglycolic acid; thiomalic acid; 2-ethylhexyl thioglycolate; diphenylethylene; and α-methylstyrene dimer. One of these molecular weight modifiers and chain transfer agents may be used individually, or two or more of these molecular weight modifiers and chain transfer agents may be used in combination in a freely selected ratio.

(Properties of Heat-Sensitive Layer Composition)

The storage modulus at 60° C. of the heat-sensitive layer composition containing particles in each of which the second component is substantially partially disposed at the outside of a particle formed from the first component is 10 kPa or more, and preferably 100 kPa or more. When the storage modulus at 60° C. of the heat-sensitive layer composition is within any of the ranges set forth above, there is no negative affect on battery characteristics in a normal state without abnormal heating. In contrast, if the storage modulus at 60° C. of the heat-sensitive layer composition is too low, an increase in internal resistance and a significant drop in battery performance may occur even in a normal state without abnormal heating. The storage modulus at 60° C. of the heat-sensitive layer composition is preferably 100 MPa or less, and more preferably 10 MPa or less.

Moreover, the storage modulus at 150° C. of the heat-sensitive layer composition containing particles in each of which the second component is substantially partially disposed at the outside of a particle formed from the first component is 1 kPa or less, and preferably 100 Pa or less. When the storage modulus at 150° C. of the heat-sensitive layer composition is within any of the ranges set forth above, internal resistance can be sufficiently increased during abnormal heating. If the storage modulus at 150° C. of the heat-sensitive layer composition is too high, the heat-sensitive layer composition does not sufficiently melt during abnormal heating, and thus internal resistance does not sufficiently increase during abnormal heating. The storage modulus at 150° C. of the heat-sensitive layer composition is preferably 1 Pa or more.

The storage modulus at 60° C. and the storage modulus at 150° C. of the heat-sensitive layer composition can be determined by the following measurement method. First, the heat-sensitive layer composition is dried at room temperature in an appropriate vessel to produce a film of 0.5 mm in thickness. The obtained film is then punched out as a circle of 8 mm in diameter to obtain a sample. A device for dynamic viscoelasticity measurement (for example, MCR 302 (product name) produced by Anton Paar) is used to measure dynamic viscoelasticity of the sample while apply strain to the sample at a frequency of 1 Hz and raising the temperature at a specific heating rate (for example, 20° C./min) in a temperature range of 25° C. to 160° C. The storage modulus can then be determined from the measurement results.

(Heat-Sensitive Layer for Lithium Ion Secondary Battery)

The presently disclosed heat-sensitive layer is formed from the heat-sensitive layer composition containing particles in each of which the second component is substantially partially disposed at the outside of a particle formed from the first component. It is preferable that the heat-sensitive layer is formed without using a binder or the like. Specifically, the heat-sensitive layer is preferably formed from only particles in which the second component is substantially partially disposed at the outer side of particles formed from the first component and/or a deformed product of these particles resulting from deformation thereof during formation of the heat-sensitive layer.

In a lithium ion secondary battery, a positive electrode including a positive electrode active material layer and a negative electrode including a negative electrode active material layer are normally stacked with a separator in-between. The presently disclosed heat-sensitive layer is preferably positioned between the opposing positive electrode active material layer and negative electrode active material layer. Specifically, the presently disclosed heat-sensitive layer may be positioned (1) between the positive electrode active material layer of the positive electrode and the separator and/or (2) between the negative electrode active material layer of the negative electrode and the separator as a separate member to the separator. Moreover, the presently disclosed heat-sensitive layer may be positioned (3) between the positive electrode active material layer of the positive electrode and the negative electrode active material layer of the negative electrode as the separator.

Examples of methods by which the heat-sensitive layer may be positioned between the positive electrode active material layer of the positive electrode and the separator include, but are not specifically limited to, a method in which the heat-sensitive layer is formed on the positive electrode active material layer of the positive electrode and the heat-sensitive layer formed on the positive electrode is then stacked in opposition to the separator, a method in which the heat-sensitive layer is formed on the separator and then the heat-sensitive layer formed on the separator is stacked in opposition to the positive electrode active material layer of the positive electrode, and a method in which the heat-sensitive layer is formed on a releasable substrate such as release paper, is subsequently peeled from the substrate, and is then positioned between the positive electrode active material layer of the positive electrode and the separator.

Examples of methods by which the heat-sensitive layer may be positioned between the negative electrode active material layer of the negative electrode and the separator include, but are not specifically limited to, a method in which the heat-sensitive layer is formed on the negative electrode active material layer of the negative electrode and the heat-sensitive layer formed on the negative electrode is then stacked in opposition to the separator, a method in which the heat-sensitive layer is formed on the separator and then the heat-sensitive layer formed on the separator is stacked in opposition to the negative electrode active material layer of the negative electrode, and a method in which the heat-sensitive layer is formed on a releasable substrate such as release paper, is subsequently peeled from the substrate, and is then positioned between the negative electrode active material layer of the negative electrode and the separator.

Examples of methods by which the heat-sensitive layer may be positioned between the positive electrode active material layer of the positive electrode and the negative electrode active material layer of the negative electrode as the separator include, but are not specifically limited to, a method in which the heat-sensitive layer is formed on a releasable substrate such as release paper, is subsequently peeled from the substrate, and is then positioned between the positive electrode active material layer of the positive electrode and the negative electrode active material layer of the negative electrode. Other examples include a method in which the heat-sensitive layer is formed on the positive electrode active material layer of the positive electrode and then the positive and negative electrodes are stacked such that the heat-sensitive layer formed on the positive electrode opposes the negative electrode active material layer of the negative electrode, and a method in which the heat-sensitive layer is formed on the negative electrode active material layer of the negative electrode and then the positive and negative electrodes are stacked such that the heat-sensitive layer formed on the negative electrode opposes the positive electrode active material layer of the positive electrode.

No specific limitations are placed on the formation method of the heat-sensitive layer in the methods of positioning the heat-sensitive layer (1) between the positive electrode active material layer of the positive electrode and the separator, (2) between the negative electrode active material layer of the negative electrode and the separator, and (3) between the positive electrode active material layer of the positive electrode and the negative electrode active material layer of the negative electrode. For example, a slurry composition containing the heat-sensitive layer composition may be applied onto the positive electrode active material layer, negative electrode active material layer, separator, or releasable substrate by doctor blading, dip coating, reverse roll coating, direct roll coating, gravure coating, extrusion coating, comma direct coating, die coating, slide die coating, brush coating, or the like, and the applied slurry composition may be dried to form the heat-sensitive layer.

Examples of drying methods that may be used include drying by warm, hot, or low-humidity air, drying in a vacuum, and drying by irradiation with (far-)infrared light or electron beams. Of these methods, drying by hot air and drying by irradiation with far-infrared light are preferable.

The drying time is normally 1 minute to 60 minutes. Moreover, the drying temperature is normally 40° C. or higher, and is a lower temperature than the melting point of the first component. The heat-sensitive layer may be formed through repeated application and drying of the slurry composition containing the heat-sensitive layer composition. Moreover, heating may be performed after formation of the heat-sensitive layer as necessary.

The slurry composition containing the heat-sensitive layer composition can be obtained through mixing of the particles set forth above, a solvent or the like such as water, and optional additives.

The thickness of the heat-sensitive layer is preferably at least 0.1 μm and not more than 5 μm, more preferably at least 0.2 μm and not more than 4 μm, and even more preferably at least 0.3 μm and not more than 3 μm from a viewpoint of obtaining good close adherence to an electrode active material layer (positive electrode active material layer or negative electrode active material layer) or a separator and a viewpoint of obtaining a lithium ion secondary battery that has low resistance in a normal state without abnormal heating.

Moreover, a value indicating close adherence of the heat-sensitive layer composition is preferably 1 or higher from a viewpoint of improving close adherence between the obtained heat-sensitive layer and an electrode active material layer (positive electrode active material layer or negative electrode active material layer) or a separator. Note that the "value indicating close adherence of the heat-sensitive layer composition" refers to the ball number obtained by carrying out an initial adhesive force test (inclination angle: 20°) stipulated in JIS Z0237 at 25° C.

(Lithium Ion Secondary Battery)

The presently disclosed heat-sensitive layer is used in a lithium ion secondary battery. In this disclosure, the lithium ion secondary battery includes a positive electrode, a negative electrode, a separator, a heat-sensitive layer, and an electrolysis solution. Note that the heat-sensitive layer may itself be used as the separator. In this case, the lithium ion secondary battery includes a positive electrode, a negative electrode, a heat-sensitive layer, and an electrolysis solution.

(Positive Electrode)

The positive electrode normally includes a current collector and a positive electrode active material layer formed on the current collector. The positive electrode can be formed by a known method without any specific limitations. Specifically, the positive electrode may be obtained by, for example, applying a slurry composition for a positive electrode that contains a positive electrode active material, a binder, a solvent, and, as necessary, a conductive material, a thickener, and the like onto the current collector, and drying the applied slurry composition for a positive electrode to form the positive electrode active material layer. The positive electrode active material layer that is formed may be further subjected to heat treatment and/or pressing treatment as necessary. Various positive electrode active materials, binders, solvents, conductive materials, and thickeners that can be used in lithium ion secondary batteries may be used as the positive electrode active material, the binder, the solvent, and the optionally used conductive material and thickener without any specific limitations.

(Negative Electrode)

The negative electrode normally includes a current collector and a negative electrode active material layer formed on the current collector. The negative electrode can be formed by a known method without any specific limitations. Specifically, the negative electrode may be obtained by, for example, applying a slurry composition for a negative electrode that contains a negative electrode active material, a binder, a solvent, and, as necessary, a conductive material, a thickener, and the like onto the current collector, and drying the applied slurry composition for a negative electrode to form the negative electrode active material layer. The negative electrode active material layer that is formed may be further subjected to heat treatment and/or pressing treatment as necessary. Various negative electrode active materials, binders, solvents, conductive materials, and thickeners that are used in lithium ion secondary batteries may be used as the negative electrode active material, the binder, the solvent, and the optionally used conductive material and thickener without any specific limitations.

(Separator)

In this disclosure, the heat-sensitive layer may be used as the separator. In a case in which the heat-sensitive layer is not used as the separator, the separator may, for example, be a microporous membrane or non-woven fabric containing a polyolefin resin such as polyethylene or polypropylene, or an aromatic polyamide resin, or may be a porous resin coating containing inorganic ceramic powder.

Moreover, in a case in which the heat-sensitive layer is not used as the separator, it is preferable that the heat-resistance temperature of the separator is higher than the melting point of the first component of the particles used in the heat-sensitive layer.

The thickness of the separator is preferably at least 0.5 μm and not more than 40 μm, more preferably at least 1 μm and not more than 30 μm, and even more preferably at least 1 μm and not more than 25 μm from a viewpoint of reducing resistance due to the separator inside the lithium ion secondary battery and providing excellent workability in production of the lithium ion secondary battery.

(Electrolysis Solution)

The electrolysis solution may, for example, be an electrolysis solution obtained by dissolving a lithium salt as a supporting electrolyte in a non-aqueous solvent but is not specifically limited thereto. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. In particular, $LiPF_6$, $LiClO_4$, and $CF_3SO_3Li$ are suitable since they readily dissolve in solvent and display a high degree of dissociation. These lithium salts may be used individually or as a mixture of two or more types. The amount of the supporting electrolyte relative to the electrolysis solution is normally 1 mass % or more, and preferably 5 mass % or more, and is normally 30 mass % or less, and preferably 20 mass % or less. When the amount of the supporting electrolyte is within any of the ranges set forth above, it is possible to inhibit a phenomenon in which ion conductivity decreases, and charge characteristics and discharge characteristics of the battery deteriorate.

The solvent used in the electrolysis solution may be any solvent in which the supporting electrolyte dissolves without any specific limitations. Normally, an alkyl carbonate such as dimethyl carbonate (DMC), ethylene carbonate (EC), diethyl carbonate (DEC), propylene carbonate (PC), butylene carbonate (BC), or methyl ethyl carbonate (MEC); an ester such as γ-butyrolactone or methyl formate; an ether such as 1,2-dimethoxyethane or tetrahydrofuran; or a sulfur-containing compound such as sulfolane or dimethyl sulfoxide is used as the solvent. In particular, dimethyl carbonate, ethylene carbonate, propylene carbonate, diethyl carbonate, and methyl ethyl carbonate are preferable since high ion conductivity can be easily obtained and these solvents have a wide useable temperature range. These solvents may be used individually or as a mixture of two or more types. Moreover, the electrolysis solution may be used with additives contained therein. Carbonate compounds such as vinylene carbonate (VC) are preferable as additives.

Examples of electrolysis solutions that may be used other than those described above include a gel-form polymer electrolysis solution obtained by impregnating a polymer electrolyte such as polyethylene oxide or polyacrylonitrile with an electrolysis solution and an inorganic solid electrolyte such as lithium sulfide, LiI, $Li_3N$, or $Li_2S$—$P_2S_5$ glass-ceramic.

The lithium ion secondary battery can be obtained by stacking the negative electrode, the positive electrode, and the heat-sensitive layer with the optional separator in-between such that the presently disclosed heat-sensitive layer is positioned between the positive electrode active material layer and the negative electrode active material layer that oppose one another, performing rolling, folding, or the like of the resultant stack in accordance with the battery shape to place the stack in a battery container, injecting the electrolysis solution into the battery container, and sealing the battery container. In other words, the lithium ion secondary battery includes a positive electrode including a positive electrode active material layer, a negative electrode including a negative electrode active material layer that opposes the positive electrode active material layer, and a heat-sensitive layer positioned between the positive electrode active material layer and the negative electrode active material layer that oppose one another. In addition, an expanded metal, an overcurrent preventing device such as a fuse or a PTC device, a lead plate, or the like may be placed in the lithium ion secondary battery as necessary in order to prevent pressure increase inside the battery and the occurrence of overcharging or overdischarging. The shape of the battery may be a laminate cell type, coin type, button type, sheet type, cylinder type, prismatic type, flat type, or the like.

Through the presently disclosed heat-sensitive layer for a lithium ion secondary battery, it is possible to efficiently block rising temperature during abnormal heating by increasing battery internal resistance and thereby reducing current.

EXAMPLES

The following describes the present disclosure through examples. However, this disclosure is not in any way limited by these examples. Note that "parts" and "%" in the examples respectively refer to "parts by mass" and "mass %" unless otherwise specified. Various physical properties and characteristics were measured and evaluated by the following methods.

<Measurement of Melting Point>

The melting point of particles formed from a first component used in each example or comparative example was measured as follows.

A differential scanning calorimeter (DSC6220SII produced by Nanotechnology) was used to heat a sample (particles formed from first component) to a temperature at least 30° C. higher than the melting point thereof, subsequently cool the sample to room temperature at a cooling rate of −10° C./min, and then perform measurement at a heating rate of 10° C./min based on JIS K7121(1987).

<Measurement of Molecular Weight>

The number average molecular weight of a polyolefin used in each example or comparative example was measured as follows.

First, 5 mL of solvent was added to 10 mg of a sample (polyolefin) and stirring was performed for 30 minutes at 140° C. to 150° C. to dissolve the sample. Next, the resultant solution was filtered using a 0.5 μm filter to obtain a measurement sample. The measurement sample was analyzed by gel permeation chromatography (GPC) under the following conditions and the number average molecular weight was determined from the results of analysis.

Measurement apparatus: PL-220 (produced by Polymer Laboratories)

Column: Shodex HT-G, HT-806M (×1), HT-803 (×1) (diameter 8.0 mm×30 cm; produced by Showa Denko K.K.)

Solvent: Trichlorobenzene+0.1% BHT

Flow rate: 1.0 mL/min

Detector: Differential refractive index (RI) detector

Column temperature: 145° C.

Standard substance: Monodisperse polystyrene (produced by Tosoh Corporation)

<Measurement of Glass Transition Temperature>

The glass transition temperature of a second component was measured by preparing a polymer (measurement sample) having the same chemical composition as the second component. Specifically, a polymer was prepared as a measurement sample under polymerization conditions that were the same as the polymerization conditions of the second component using monomers leading to the second component that were used in preparation of the second component. The glass transition temperature of the measurement sample was then measured based on JIS K7121 (1987) using a differential scanning calorimeter (DSC6220SII produced by Nanotechnology), and the measured glass transition temperature was taken to be the glass transition temperature of the second component.

<Measurement of Storage Modulus>

A water dispersion of a heat-sensitive layer composition prepared in each example or comparative example was dried for 168 hours at a temperature of 23° C. to obtain a film of 0.5 mm in thickness, and a circle of 8 mm in diameter was punched out from the film as a measurement sample.

Dynamic viscoelasticity was measured under the following conditions using the following apparatus. The storage modulus at 60° C. and the storage modulus at 150° C. were determined based on the measurement results.

Apparatus: Rheometer MCR 302 (produced by Anton Paar)

Set temperature range: 25° C. to 160° C.

Set heating rate: 20° C./min

Set frequency: 1 Hz

<Close Adherence of Heat-Sensitive Layer>

A water dispersion of a heat-sensitive layer composition prepared in each example or comparative example was applied onto corona-treated PET film and dried to form a composition layer of 2 μm in thickness and obtain a measurement sample. Based on JIS Z0237, the measurement sample was placed at an inclination angle of 20° with the composition layer at the surface in an environment having a temperature of 23° C., steel spheres of 30 different sizes ranging from 1/32 inch in diameter to 32/32 inch in diameter were rolled from a position 10 cm up the slope from the measurement sample with an initial velocity of 0. The size (ball number) of a largest diameter sphere that stopped on the composition layer was taken to be a value indicating close adherence of the heat-sensitive layer and was evaluated by the following standard. A value within the range corresponding to "Pass" indicates that the heat-sensitive layer has excellent close adherence.

Pass: Ball number of 1 or higher

Fail: Ball number of 0

<Resistance Increase During Abnormal Heating>

A lithium ion secondary battery produced in each example or comparative example was charged to a state of charge (SOC) of 50% at 1 C (C is a value expressed by rated capacity (mA)/1 h (hours)) in an environment having a temperature of 60° C. Thereafter, 10 seconds of charging and 10 seconds of discharging at 0.5 C, 1.0 C, 1.5 C, and 2.0 C were performed centered on an SOC of 50%. Battery voltage after 10 seconds at the discharging side was plotted against the current value, and the gradient of this plot was determined as IV resistance (Ω) (IV resistance during discharge). Moreover, the value of {(IV resistance of lithium ion secondary battery in which 160° C.-heated positive electrode (A3) is used)/(IV resistance of lithium ion secondary battery in which positive electrode (A2) not heated to 160° C. is used)}×100(%)

was taken to be the IV resistance increase rate and was evaluated by the following standard. A higher value indicates better resistance increase during abnormal heating.

A: IV resistance increase rate of 400% or more

B: IV resistance increase rate of at least 300% and less than 400%

C: IV resistance increase rate of at least 200% and less than 300%

D: IV resistance increase rate of less than 200%

Example 1

<Preparation of Water Dispersion of Heat-Sensitive Layer Composition (A1)>

A polymerization can A was charged with 100 parts of deionized water and 100 parts in terms of solid content of a 30% aqueous emulsion of a polyolefin (polyethylene wax (melting point: 95° C.; number average molecular weight: 7,300)) as a first component, 0.2 parts of ammonium persulfate and 10 parts of deionized water were further added, and heating was performed to 70° C. Moreover, a separate polymerization can B was charged with 30 parts of deionized water and with 35 parts of 2-ethylhexyl acrylate (hereinafter, also referred to as "2-EHA") and 15 parts of styrene (hereinafter, also referred to as "St") as monomers leading to a second component, 0.5 parts of ethylene glycol dimethacrylate and 2 parts in terms of solid content of a 20% aqueous solution of ammonium polyoxyalkylene alkenyl ether sulfate were further added and sufficiently stirred, and these materials were continuously added into the polymerization can A over 120 minutes. Moreover, a polymerization reaction was continued while maintaining a temperature of 70° C. until the polymerization conversion rate reached 98%. Cooling was performed to terminate the reaction and yield a water dispersion of a heat-sensitive layer composition (A1).

The glass transition temperature of the second component included in particles contained in the resultant heat-sensitive layer composition (A1) was −37° C. In the particles contained in the heat-sensitive layer composition (A1), the second component was substantially partially disposed at the outside of particles formed from the first component. The resultant heat-sensitive layer composition (A1) had a storage modulus at 60° C. of 204 kPa and a storage modulus at 150° C. of 70 Pa. The value indicating heat-sensitive layer close adherence (ball number) was 1.

<Production of Positive Electrode (Positive Electrode (A2) and 160° C.-Heated Positive Electrode (A3)) for Lithium Ion Secondary Battery>

A slurry composition for a positive electrode was prepared by mixing lithium cobalt oxide (LiCoO$_2$; number average particle diameter: 20 μm) as a positive electrode active material, an N-methyl-2-pyrrolidone solution of dissolved polyvinylidene fluoride as a binder, and acetylene black as a conductive material such that a mass ratio of the positive electrode active material, binder, and conductive material in terms of solid content was 90:5:5. The slurry composition for a positive electrode was applied onto aluminum foil serving as a current collector and was dried at 80° C. and then at 140° C. Thereafter, rolling was performed by a roller to form a positive electrode active material layer. Next, the water dispersion of the heat-sensitive layer composition (A1) was applied onto the positive electrode active material layer and was subsequently dried at a lower temperature than the melting point of the first component to form a heat-sensitive layer on the positive electrode active material layer. A plurality of positive electrodes (A2) were then produced through current collector tab attachment. Some of these positive electrodes were heated for 5 minutes at 160° C. in a vacuum environment to produce 160° C.-heated positive electrodes (A3).

<Production of Negative Electrode for Lithium Ion Secondary Battery>

A slurry composition for a negative electrode was prepared by mixing artificial graphite (volume average particle diameter: 25 μm) as a negative electrode active material, an aqueous solution of carboxymethyl cellulose sodium salt as a thickener, and a water dispersion of a styrene-butadiene copolymer as a binder such that a mass ratio of the negative electrode active material, thickener, and binder in terms of solid content was 100:2:2. The slurry composition for a negative electrode was applied onto copper foil serving as a current collector and was dried at 60° C. and then at 120° C. Thereafter, rolling was performed using a roller, and a current collector tab was attached to produce a negative electrode.

<Production of Electrolysis Solution>

An electrolysis solution was produced by dissolving $LiPF_6$ as an electrolyte in a solvent in which ethylene carbonate and diethyl carbonate were mixed in a mass ratio of 1:2 such that the $LiPF_6$ had a concentration of 1.0 M.

<Production of Lithium Ion Secondary Battery>

The positive electrode for a lithium ion secondary battery with the attached heat-sensitive layer and the negative electrode for a lithium ion secondary battery that were produced were wound to produce a roll in a manner such that the positive electrode active material layer with the attached heat-sensitive layer and the negative electrode active material layer opposed one another with a separator made from polyethylene in-between. The obtained roll was compressed from one direction. The compressed roll had an oval shape in plan-view. The compressed roll was sealed in a specific aluminum laminate case with the electrolysis solution to produce a lithium ion secondary battery having a rated capacity of 720 mAh. Note that lithium ion secondary batteries were produced using both a positive electrode (A2) and a 160° C.-heated positive electrode (A3) as the positive electrode for a lithium ion secondary battery, and the resistance increase during abnormal heating was evaluated. The results are shown in Table 1.

Example 2

A water dispersion of a heat-sensitive layer composition (A1) was prepared in the same manner as in Example 1 with the exception that the type of first component used in preparation of the water dispersion of the heat-sensitive layer composition (A1) was changed to polyethylene wax having a melting point of 130° C. and a molecular weight of 9,900. In the particles contained in this heat-sensitive layer composition (A1), the second component was substantially partially disposed at the outside of particles formed from the first component. The resultant heat-sensitive layer composition (A1) had a storage modulus at 60° C. of 2,010 kPa and a storage modulus at 150° C. of 80 Pa. The value indicating heat-sensitive layer close adherence (ball number) was 1. Production of a positive electrode for a lithium ion secondary battery (positive electrode (A2) and 160° C.-heated positive electrode (A3)), production of a negative electrode for a lithium ion secondary battery, production of an electrolysis solution, and production of a lithium ion secondary battery were carried out in the same manner as in Example 1 with the exception that the heat-sensitive layer composition (A1) obtained as described above was used. Moreover, evaluations were performed in the same manner as in Example 1. The results are shown in Table 1.

Example 3

A water dispersion of a heat-sensitive layer composition (A1) was prepared in the same manner as in Example 1 with the exception that 35 parts of n-butyl acrylate (hereinafter, also referred to as "BA") and 15 parts of acrylonitrile (hereinafter, also referred to as "AN") were used as monomers leading to a second component used in preparation of the water dispersion of the heat-sensitive layer composition (A1). In the particles contained in this heat-sensitive layer composition (A1), the second component was substantially partially disposed at the outside of particles formed from the first component. The glass transition temperature of the second component in the resultant heat-sensitive layer composition (A1) was −20° C. The resultant heat-sensitive layer composition (A1) had a storage modulus at 60° C. of 268 kPa and a storage modulus at 150° C. of 70 Pa. The value indicating heat-sensitive layer close adherence (ball number) was 1. Production of a positive electrode for a lithium ion secondary battery (positive electrode (A2) and 160° C.-heated positive electrode (A3)), production of a negative electrode for a lithium ion secondary battery, production of an electrolysis solution, and production of a lithium ion secondary battery were carried out in the same manner as in Example 1 with the exception that the heat-sensitive layer composition (A1) obtained as described above was used. Moreover, evaluations were performed in the same manner as in Example 1. The results are shown in Table 1.

Comparative Example 1

A water dispersion of a heat-sensitive layer composition (A1) was prepared in the same manner as in Example 1 with the exception that the type of first component used in preparation of the water dispersion of the heat-sensitive layer composition (A1) was changed to polyethylene wax having a melting point of 50° C. and a molecular weight of 4,500. In the particles contained in this heat-sensitive layer composition (A1), the second component was substantially partially disposed at the outside of particles formed from the first component. The resultant heat-sensitive layer composition (A1) had a storage modulus at 60° C. of 150 Pa and a storage modulus at 150° C. of 70 Pa. The value indicating heat-sensitive layer close adherence (ball number) was 1. Production of a positive electrode for a lithium ion secondary battery (positive electrode (A2) and 160° C.-heated positive electrode (A3)), production of a negative electrode for a lithium ion secondary battery, production of an electrolysis solution, and production of a lithium ion secondary battery were carried out in the same manner as in Example 1 with the exception that the heat-sensitive layer composition (A1) obtained as described above was used. Moreover, evaluations were performed in the same manner as in Example 1. The results are shown in Table 1.

Comparative Example 2

A water dispersion of a heat-sensitive layer composition (A1) was prepared in the same manner as in Example 1 with the exception that 70 parts of 2-EHA and 30 parts of St were used as monomers leading to a second component used in preparation of the water dispersion of the heat-sensitive layer composition (A1). In the particles contained in this heat-sensitive layer composition (A1), the second component completely covered the outside of particles formed from the first component. The resultant heat-sensitive layer composition (A1) had a storage modulus at 60° C. of 1,490 kPa and a storage modulus at 150° C. of 70 kPa. The value indicating heat-sensitive layer close adherence (ball number) was 1. Production of a positive electrode for a lithium ion secondary battery (positive electrode (A2) and 160° C.-heated positive electrode (A3)), production of a negative electrode for a lithium ion secondary battery, production of an electrolysis solution, and production of a lithium ion secondary battery were carried out in the same manner as in Example 1 with the exception that the heat-sensitive layer composition (A1) obtained as described above was used. Moreover, evaluations were performed in the same manner as in Example 1. The results are shown in Table 1.

Comparative Example 3

A water dispersion of a heat-sensitive layer composition (A1) was obtained through addition of 100 parts of deionized water and 100 parts in terms of solid content of a 30% aqueous emulsion of a polyethylene wax (melting point: 95° C.; number average molecular weight: 7,300) as a first component without adding a second component. In the particles contained in this heat-sensitive layer composition (A1), a second component did not completely cover the outside of particles formed from the first component and was not substantially partially disposed at the outside of particles formed from the first component. The resultant heat-sensitive layer composition (A1) had a storage modulus at 60° C. of 172 kPa and a storage modulus at 150° C. of 70 Pa. The value indicating heat-sensitive layer close adherence (ball number) was 0. Production of a positive electrode for a lithium ion secondary battery (positive electrode (A2) and 160° C.-heated positive electrode (A3)) was carried out in the same manner as in Example 1 with the exception that the heat-sensitive layer composition (A1) obtained as described above was used. However, close adherence of the heat-sensitive layer composition (A1) was inadequate and it was not possible to form a heat-sensitive layer. Consequently, it was not possible to produce a lithium ion secondary battery or evaluate resistance increase during abnormal heating.

As can be seen from Table 1, in the case of a heat-sensitive layer for a lithium ion secondary battery that was formed from a heat-sensitive layer composition containing particles in each of which a second component was substantially partially disposed at the outside of a particle formed from a first component, and in which the heat-sensitive layer composition had a storage modulus at 60° C. of 10 kPa or more and a storage modulus at 150° C. of 1 kPa or less, close adherence of the heat-sensitive layer for a lithium ion secondary battery was good and resistance increase during abnormal heating of a lithium ion secondary battery obtained using the heat-sensitive layer was good.

The invention claimed is:

1. A heat-sensitive layer for a lithium ion secondary battery comprising:
   a heat-sensitive layer composition having a particle;
   the particle having a core and a shell;
   the core being composed of a first polymer having a melting point of at least 60° C.;
   the shell being composed of a second polymer, the second polymer being different from the first polymer, and the second polymer having a glass transition temperature of not higher than 20° C.; and wherein,
   the shell is disposed at an exterior of the core such that the core is not completely covered by the shell, wherein the core and the shell are exposed to an exterior of the particle; and wherein
   the heat-sensitive layer composition has a storage modulus at 60° C. of 10 kPa or more, and
   the heat-sensitive layer composition has a storage modulus at 150° C. of 1 kPa or less.

2. The heat-sensitive layer for the lithium ion secondary battery according to claim 1, wherein the heat-sensitive layer composition is positioned between a positive electrode active material layer and a negative electrode active material layer that oppose one another.

3. The heat-sensitive layer for the lithium ion secondary battery according to claim 1, wherein
   the melting point of the first polymer is not higher than 160° C.

4. The heat-sensitive layer for the lithium ion secondary battery according to claim 1, wherein
   the glass transition temperature of the second polymer is at least −60° C.

TABLE 1

| | | | Example 1 | Example 2 | Example 3 | Comparative Example 1 | Comparative Example 2 | Comparative Example 3 |
|---|---|---|---|---|---|---|---|---|
| Heat-sensitive layer composition (A1) | First component | Melting point | 95° C. | 130° C. | 95° C. | 50° C. | 95° C. | 95° C. |
| | | Polyolefin molecular weight | 7,300 | 9,900 | 7,300 | 4,500 | 7,300 | 7,300 |
| | | Charged amount | 100 parts | 100 parts | 100 parts | 100 parts | 100 parts | 100 parts |
| | Second component | Glass transition temperature | −37° C. | −37° C. | −20° C. | −37° C. | −37° C. | No second component |
| | | Charged amount | 2-EHA = 35 parts St = 15 parts | 2-EHA = 35 parts St = 15 parts | BA = 35 parts AN = 15 parts | 2-EHA = 35 parts St = 15 parts | 2-EHA = 70 parts St = 30 parts | |
| | Storage modulus at 60° C. | | 204 kPa | 2,010 kPa | 268 kPa | 150 Pa | 1,490 kPa | 172 kPa |
| | Storage modulus at 150° C. | | 70 Pa | 80 Pa | 70 Pa | 70 Pa | 70 kPa | 70 Pa |
| Evaluation | Heat-sensitive layer close adherence (JIS Z0237) | | Pass | Pass | Pass | Pass | Pass | Fail |
| | Resistance increase during abnormal heating (IV resistance increase rate) | | A | A | A | D | D | — |

5. The heat-sensitive layer for the lithium ion secondary battery according to claim 1, wherein
the first polymer includes a polyolefin having a number average molecular weight of at least 5,000 and not more than 15,000.

6. The heat-sensitive layer for the lithium ion secondary battery according to claim 1, wherein the heat-sensitive layer composition is formed from a deformed product, the deformed product being formed during deformation of the first polymer and the second polymer.

7. The lithium ion secondary battery comprising the heat-sensitive layer according to claim 1, wherein the heat-sensitive layer composition is positioned between a positive electrode active material layer and a negative electrode active material layer that oppose one another.

* * * * *